United States Patent [19]
Douglas

[11] Patent Number: 5,027,142
[45] Date of Patent: Jun. 25, 1991

[54] COLLAPSIBLE CAMERA

[75] Inventor: Lawrence M. Douglas, South Easton, Mass.

[73] Assignee: Polaroid Corporation, Cambridge, Mass.

[21] Appl. No.: 517,708

[22] Filed: May 2, 1990

[51] Int. Cl.⁵ .............................................. G03B 17/50
[52] U.S. Cl. ........................................ 354/86; 354/187
[58] Field of Search ................... 354/85, 86, 187, 288, 354/83, 84

[56] References Cited
U.S. PATENT DOCUMENTS

4,688,913  8/1987  Whiteside et al. .............. 354/187 X

Primary Examiner—L. T. Hix
Assistant Examiner—Howard B. Blankership
Attorney, Agent, or Firm—Alfred E. Corrigan

[57] ABSTRACT

A camera including a plurality of housings pivotally coupled to each other for movement from a collapsed compact position in which a subject may be framed in a viewfinder of the camera, to an erected position during which an exposure of the subject may be made, and then returned to their original collapsed position. The movement of the housings from the collapsed to the erected and then back to the collapsed position is in response to the actuation of the camera's shutter release.

34 Claims, 11 Drawing Sheets

COLLAPSIBLE CAMERA

RELATED APPLICATIONS

This application is related to my application Ser. No. 517,847 entitled Camera Having Film Cassette Hold Back/Film Exit Shade, and to my application Ser. No. 517,707, entitled Pivotally Mounted Spread Roller Assembly, both of which are being filed on instant date herewith.

BACKGROUND OF THE INVENTION

1. Field of the Invention

The invention relates to a folding camera and more particularly to such a camera having a plurality of housings which are driven from a collapsed position to an erected position and back to a collapsed position during an exposure cycle.

2. Description of the Prior Art

One of the more desirable features of a camera is its compactness, and thus a large number of today's cameras are of the folding or collapsible type. However, once such a camera is erected in preparation for the taking of a series of photographic exposures, the issue of compactness is again raised. What does one do with the relatively large erected camera between exposures? Should the photographer momentarily put it aside until he has had time to reposition the subject for the next exposure? Should the photographer continue to hold the erected camera during such repositioning of the subject, thus subjecting the lens to possible inadvertent contact by the photographer's finger(s)? It might be argued that this problem could be obviated by collapsing the camera after every exposure but that solution would hardly be embraced by the casual photographer. Further, what of the tourist who wants to take one more exposure as the last of a group of such tourists is scurrying to board their tour bus? Will such a tourist have time to erect the camera, take the exposure, and then collapse the camera before the bus starts to pull away; or will he forgo collapsing the camera in order to board such bus thereby subjecting components of the erected camera, e.g., the lens and/or bellows, to damage during any jostling while boarding the bus? One practical solution is to provide such a camera which assumes the erected position only during a photographic exposure, and at the completion of such exposure automatically returns to its compact collapsed condition.

The prior art fails to address the foregoing problem, if in fact it was even appreciated. U.S. Pat. No. 3,906,521 describes an instant or self-developing camera of the collapsible type in which the camera is erected prior to an exposure, the exposure taken, and then the camera is collapsed. Collapsing of the camera is effective to drive the exposed film unit through a processing liquid spreading means and then to the exterior of the camera. However, the photographer must still actuate a button to release the camera's shutter and lens housing for movement to its erect operative position, press another button to initiate an exposure, and subsequent to exposure, manually move said housing back into its collapsed position.

SUMMARY OF THE INVENTION

The present invention relates to a camera comprised of a plurality of housings pivotally coupled to each other for automatic movement from a compact collapsed position to an erect condition in which an exposure of a scene is made and then back to its original compact collapsed position, such movement preferably occurring in response to the actuation of an exposure cycle initiating button. The camera includes first and second housings which are pivotally coupled to a third housing for movement in opposite directions as the camera is erected, and toward each other as the camera is collapsed.

The first housing includes means for mounting a shutter and lens assembly and a mirror for reflecting an image toward a focal plane. The second housing includes an open ended chamber for receiving and locating a film cassette in position for the sequential exposure of a plurality of instant or self-developing film units contained therein. The third housing is located intermediate the first and second housings and a bellows extends between the first and second housings and through the third housing so as to define a lighttight path therebetween when the camera is in the erected position. A forward end of the third housing is provided with a spread roller assembly. The spread roller assembly is pivotally connected to the third housing for movement between an operative position, wherein the bite between the rollers is located in position to receive a film unit as it is moved from the film cassette subsequent to its exposure, and an inoperative position in which the rollers are disconnected from their drive gear and are accessible for cleaning, such movement being in response to the pivoting of a door into an open position. The door is pivotally mounted adjacent the exit side of the spread rollers for precluding the entry of ambient light into the camera. A resilient coil of opaque sheet material has one of its ends secured to an interior surface of the door such that when an exposed film unit is being advanced by the spread rollers toward the door while a processing liquid is being spread across a layer of the film unit, the leading edge of the film unit engages the interior surface thereof and starts the pivoting of the door toward an open position while simultaneously sliding down such interior surface until it engages the coil of opaque sheet material. Further movement of the leading edge of the film unit will cause the coiled sheet to unwind in a manner that the unwound sheet material will progressively cover the face or front surface of the film unit (surface through which the exposure was made) as it starts to emerge from under a free end of the door and exit into the ambient light. The length of the opaque sheet material is long enough to provide the additional dark time necessary for the developing image in the film unit to reach a state whereat its emerging image will no longer be adversely affected by the ambient light; but short enough so that it is completely unwound or uncoiled before a trailing end of the film unit leaves the bite of the spread rollers. Thus, the free end of the opaque sheet material releases its grip on the leading edge of the film unit and snaps back to its coiled condition just as the trailing end leaves the bite of the rollers. In such coiled condition, the coiled sheet of opaque material cooperates with a surface of the camera to pinch the trailing end of the film unit to releasably retain the latter in engagement with the camera.

The third housing also includes means for supporting a viewfinder, a strobe, a battery driven motor, and a power train, e.g., a plurality of gears, for connecting the motor with various elements of the camera, e.g., a single revolution cam which cooperates with an erecting linkage assembly, a film advancing assembly and the spread roller assembly.

The camera is normally in a collapsed position when in transport. When the photographer wishes to photograph a scene, he merely frames the scene in the camera's viewfinder and then depresses an exposure initiating cycle button. In response to such actuation, the camera's motor drives the aforementioned cam which, in cooperation with the linkage system, drives the first and second housings in opposite directions into their erected positions, and the drive to the cam is stopped. The strobe illuminates the scene with a first burst of light the reflection of which is then used to produce an electrical signal which is representative of the camera-to-subject distance. The camera's exposure parameters are automatically set in response to this signal. The camera's shutter is then automatically actuated to expose the uppermost film unit in the film cassette to the scene light which has been reflected onto it by the mirror in the first housing. During the exposure, the strobe emits a second burst of light for supplementing the ambient scene light. Substantially immediately subsequent to the exposure, the rotation of the cam is started again to cause the first and second housings to be returned to their original compact collapsed position against the bias of a plurality of camera housing erecting springs. Once the housings of the camera are in the collapsed position, rotation of the cam then drives the film advancing mechanism in a manner which moves the exposed film unit partially from the film cassette and into the bite of the rotating spread rollers. The latter continue the movement of the exposed film unit toward the aforementioned door and to the exterior of the camera while simultaneously rupturing a container of processing liquid having an opacifier therein and spreading its contents between predetermined layers thereof to initiate the formation of a visible image therein. Rotation of the cam then stops as it completes one full rotation and the exposure cycle is over. The total elapsed time of such cycle is preferably between 330 and 660 milliseconds. A typical cycle could be 200 milliseconds to move the housings to the erected position, 330 milliseconds exposure time, and 100 milliseconds to return the housings to the collapsed position.

As mentioned previously, the second housing includes an open ended chamber for receiving a film cassette. When a film cassette is so received, its film exit slot is located at the open end of the chamber. A light seal is mounted on the second housing in order to prevent the entry of ambient light into the film cassette via the slot when the second housing is being moved into and out of the erected position. The light seal or shade has a generally L-shaped configuration when viewed in cross section, and one of the legs of the L deters movement of the film cassette out of the open ended chamber as the second housing moves into and out of the erected position. This light seal, which is preferably formed from a resilient material, is configured with a laterally extending opening which is adapted to be located in substantial alignment with the film cassette's slot only when the second housing is in the collapsed position. Thus, an exposed film unit may be moved out of the cassette via its slot, through the opening in the light seal, and then into the bite of the spread rollers. The light seal is maintained in this latter position by its engagement with a surface of the third housing. When the second housing is moved away from the third housing, a spring or the resiliency of the light seal moves it to a position in which the slot and opening are out of alignment thereby precluding the entry of light into the cassette via its slot, which light may be actinic to the film therein.

An object of the invention is to provide a camera which during a photographic cycle automatically erects and collapses.

Another object of the invention is to provide a camera by which a scene may be framed in a viewfinder while the camera is in a compact collapsed position and which camera is erected and collapsed in response to the initiation of a photographic cycle.

Another object of the invention is to provide a camera with a main housing having recesses in its upper and lower surfaces for receiving upper and lower housings of the camera when the camera is in a collapsed position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
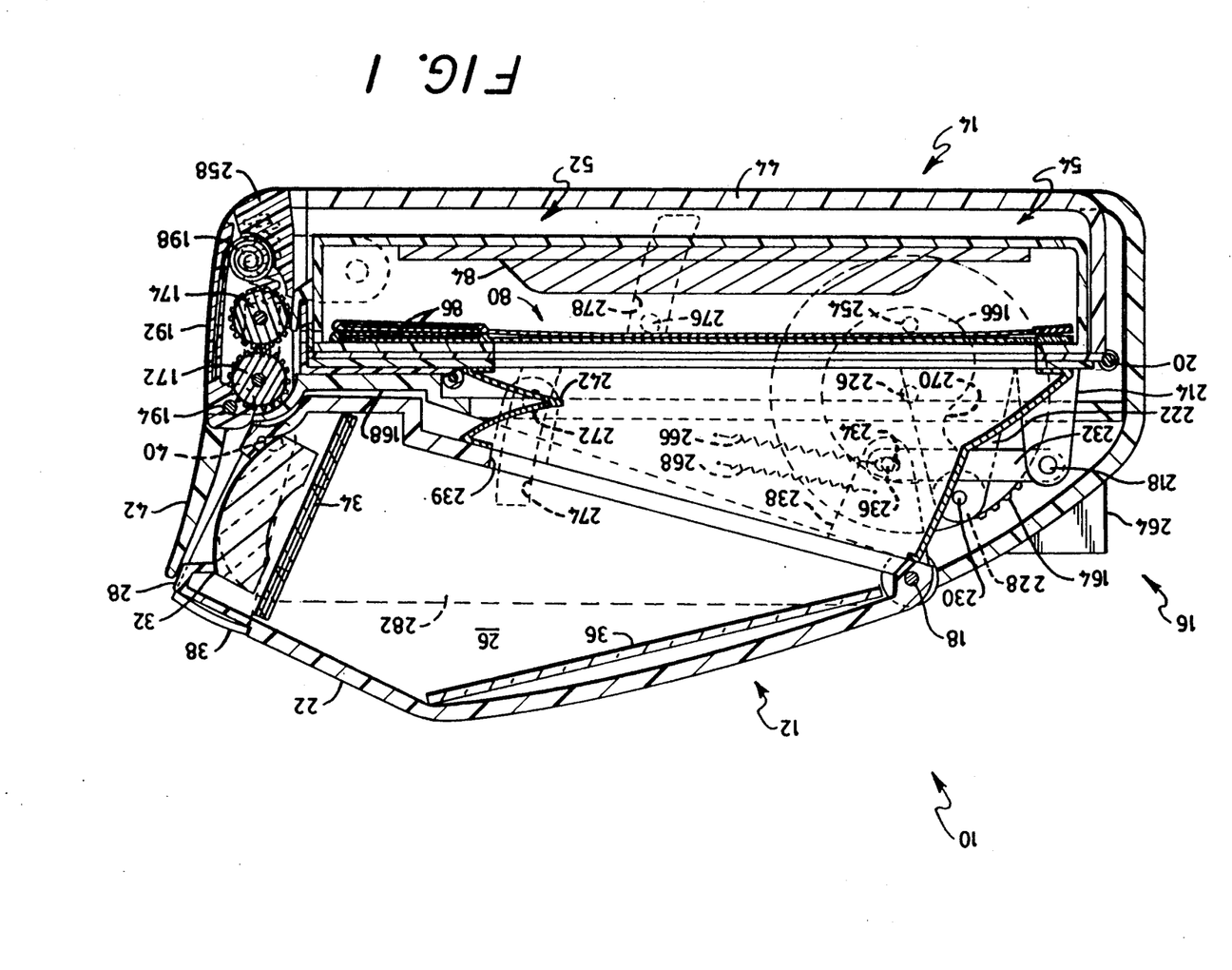
FIG. 1 is a side view in cross-section of a camera which incorporates a preferred embodiment of the present invention, the camera being shown in a collapsed position.
Figure 2:
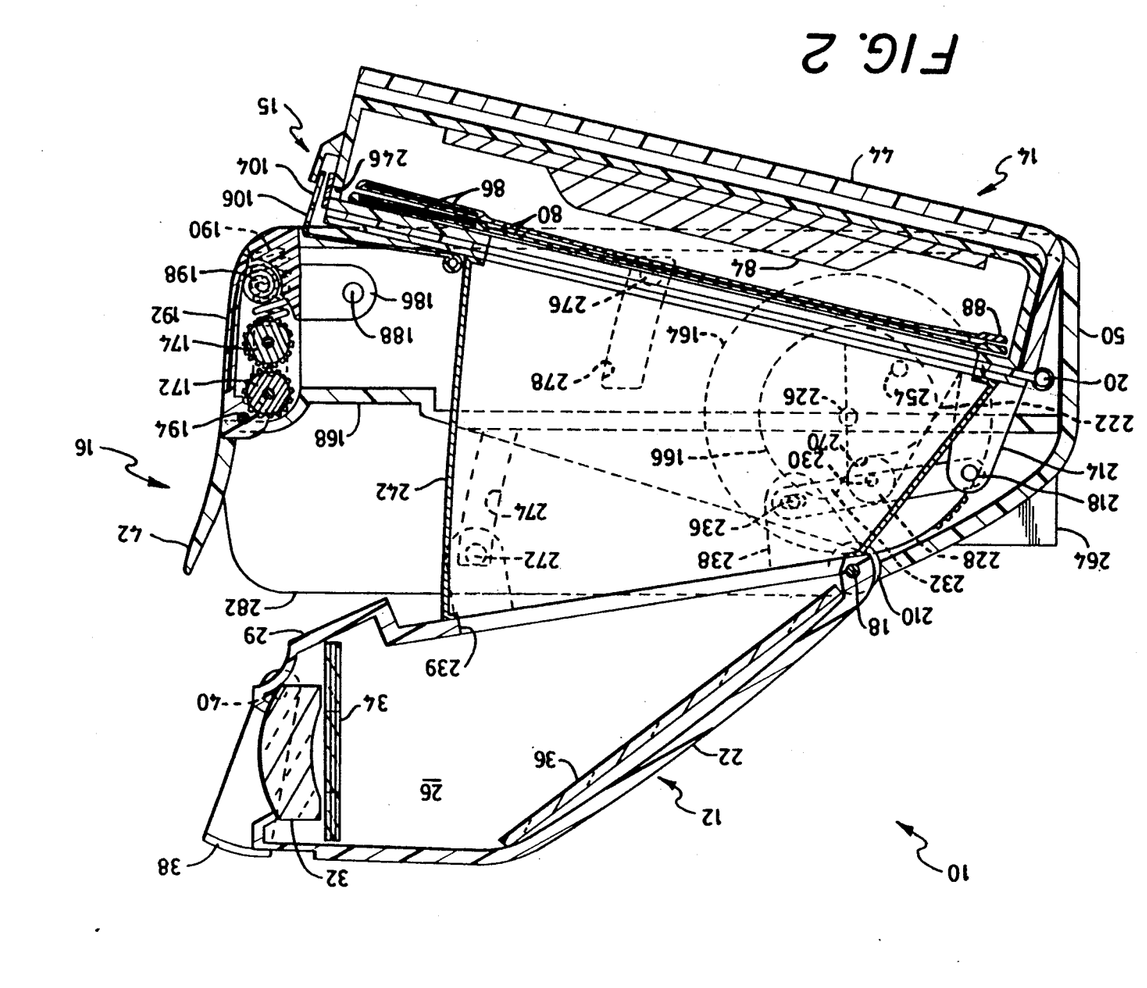
FIG. 2 is a side view similar to FIG. 1 showing the camera in its erect picture taking position.

Reference is now made to the drawings wherein is shown a camera 10 which incorporates a preferred embodiment of the invention. The camera 10 includes first, second and third housings 12, 14 and 16, respectively, which are coupled to each other for movement between a collapsed compact position (as shown in FIG. 1) in which a subject may be viewed in a viewfinder of the camera and an erected position (as shown in FIG. 2) wherein an exposure of the subject may be taken. The third housing 16 is pivotally coupled to the first housing 12 by a hinge pin 18 and to the second housing 14 by a hinge pin 20.

The first housing 12 includes a top wall 22 from which depend a pair of side walls 24 and 26 and a front wall 28 having a rearwardly extending section 29 (FIG. 2). The front wall 28 includes a centrally located aperture 30 (FIG. 4) in which an objective lens 32 is mounted. The lens 32 is positioned to direct image bearing light rays through a shutter 34 (see FIG. 2) and onto a mirror 36 which is fixedly secured within the first housing 12. The mirror 36, in turn, is adapted to reflect such light towards a film unit located within the second housing 14 only when the housings are in the erected position shown in FIG. 2. A U-shaped lens shade 38 has the free ends of its legs pivotally coupled to the front wall 28 by a hinge 40 for automatic movement between its operative position, shown in FIG. 2, and its inoperative position shown in FIG. 1 wherein it is located within a correspondingly U-shaped recess (not shown) in the front wall 28. The shade 38 is resiliently biased into its operative position and is cammed into its inoperative position during the collapse of the camera due to its engagement with a flange 42 on the third housing 16. The flange 42 also functions to protect the lens 32 when the housing 12 is in the collapsed position. The flange 42 is pivotally coupled to the front of the camera 10 by a hinge 194 and may be manually moved from its solid line position (into which it is spring biased) to its broken line position (see FIG. 3) so as to expose the face of the lens 32 for cleaning purposes.

The second housing 14 includes a holder 15 which is defined by a bottom wall 44, a pair of laterally spaced side walls 46 and 48 and an end wall 50 which cooperate with each other to define an open ended chamber 52 for slidably receiving a film cassette 54. The end wall 50 includes a knuckle 56 for receiving the hinge pin 20. Each of the side walls 46 and 48 includes an open ended recess 58 and 60, respectively, for receiving correspondingly shaped protrusions 62 (only one shown) located on the side walls 64 and 66 of the cassette 54 for properly locating and guiding the latter into the chamber 52. The second holder 15 further includes an upper wall 68 having therein an elongate slot 70 which also extends part way down the trailing end wall 50 (for receiving a film unit engaging member) and a rectangularly shaped opening 72. The slot 70 and the opening 72 are constructed to be located in alignment with the correspondingly shaped slot and opening 74 and 76, respectively, in a wall 78 of the cassette 54.

The cassette 54 encloses a stack of self-developing film units 80 having a dark slide 82 on one end, to prevent premature exposure of a film unit during loading of a cassette 54 into the camera 10, and a battery 84 at its opposite end. Each of the film units 80 includes a rupturable container 86 of processing liquid at its leading end and a trap 88 at its opposite end for receiving any excess processing liquid that may remain after it has been spread between predetermined layers of the film unit.

The second housing 14 also includes a receptacle 90 having an open bottom for receiving the holder 15. The receptacle 90 is defined by a pair of laterally spaced side walls 92 and 94 and an upper wall 96. A pair of knuckles 100 and 102 for receiving the hinge pin 20 are formed in a trailing end of the upper wall 96. A shade in the form of an L-shaped opaque member 104 having a laterally extending opening 106 therein is pivotally connected by a hinge 108 to the opposite end of the upper wall 96.

Also, the upper wall 96 includes an aperture 110 which is coextensive with the aperture 72 in the holder 15. A lighttight bellows 112 is secured to the upper wall 96 around the perimeter of the opening 110.

Figure 5:
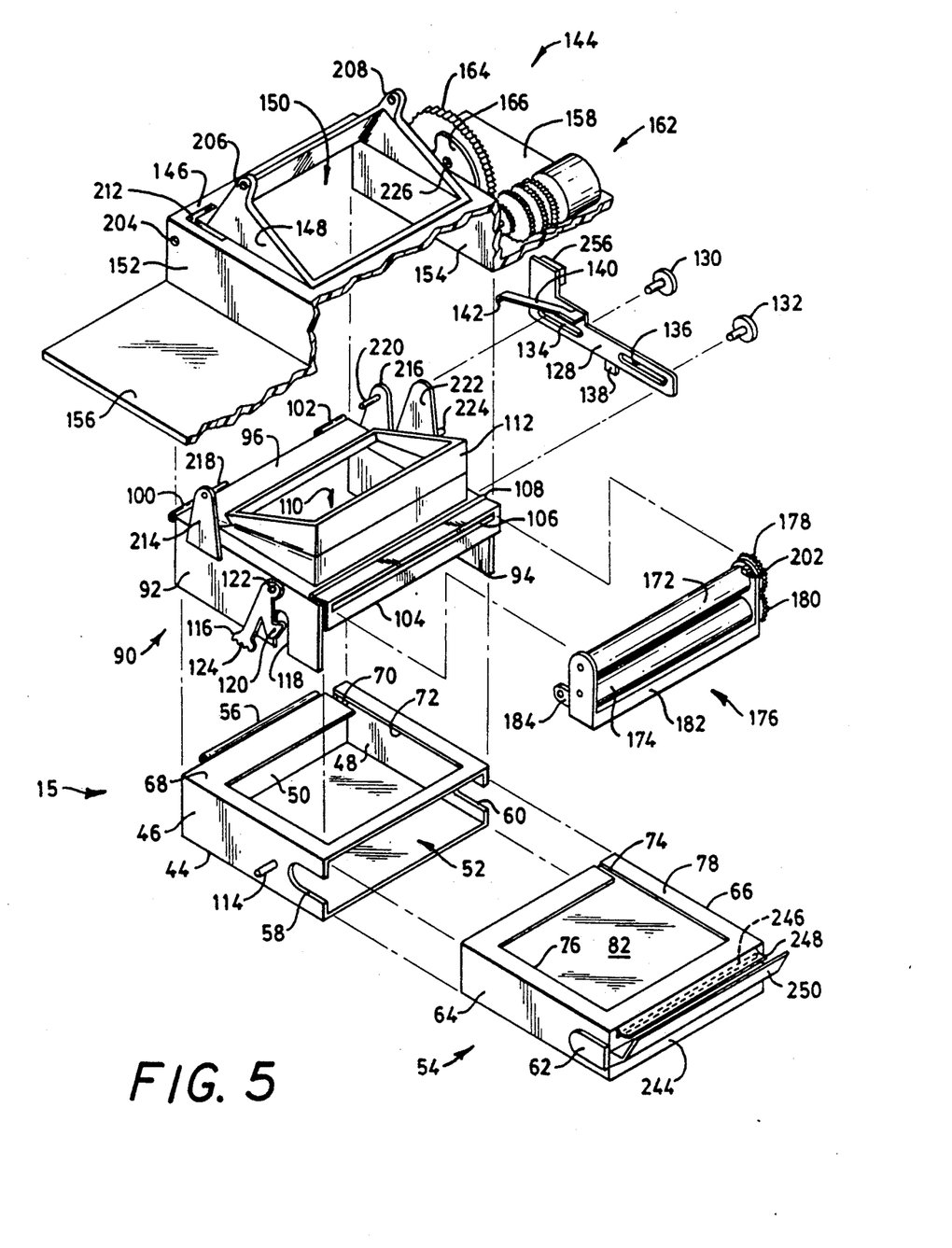
FIG. 5 is an exploded perspective view of a portion of the camera.

The holder 15 is dimensional to fit upwardly between the side walls 92 and 94 of the receptacle 90 with the knuckle 56 located between the knuckles 100 and 102 thus, in cooperation with the pin 20, pivotally coupling the holder 15 and the receptacle 90 to each other. The holder 15 is releasable secured to the receptacle 90 by a latch that includes a latch pin 114 which extends outwardly from the wall 46 of the holder 15 and a latch plate 116. When the holder 15 is rotated in a CCD, as viewed in FIG. 3, the pin 114 enters an open ended slot 118 in the wall 92 of the receptacle 90 and cams the latch plate 116 in a clockwise direction against the bias of its spring (not shown) until it clears a lip 120. At this point, the latch plate 118 rotates in a counterclockwise direction (CCD) about its pivot 122 to latch the holder 15 to the receptacle 90. Unlatching of the two members 15 and 90 is accomplished by manually moving an end 124 of the latch plate to the left (as viewed in FIG. 5). The end 124 of the latch plate 116 protrudes to the exterior of the camera 10 via an opening or recess (not shown) in a bottom wall 126 of the third housing 16.

A plate 128 is reciprocally mounted to the side wall 94 of the receptacle 90 by a pair of pins 130 and 132 which extend through elongate openings 134 and 136 in the plate 128. Extending downwardly from the plate 128 is a tab 138 to which one end of a tension spring 129 (FIG. 6) is secured for biasing the plate 128 toward the rear of the camera. A resilient arm 140 extends inwardly of the plate 128 and then downwardly, in cantilever fashion, to a point where it terminates in a film unit engaging member 142. The arm 140 extends through an elongate slot (not shown) in the side wall 94 to a point where the film unit engaging member 142 is located just rearwardly of the superposed slots 70 and 74 in the holder 15 and film cassette 54.

Figure 10:
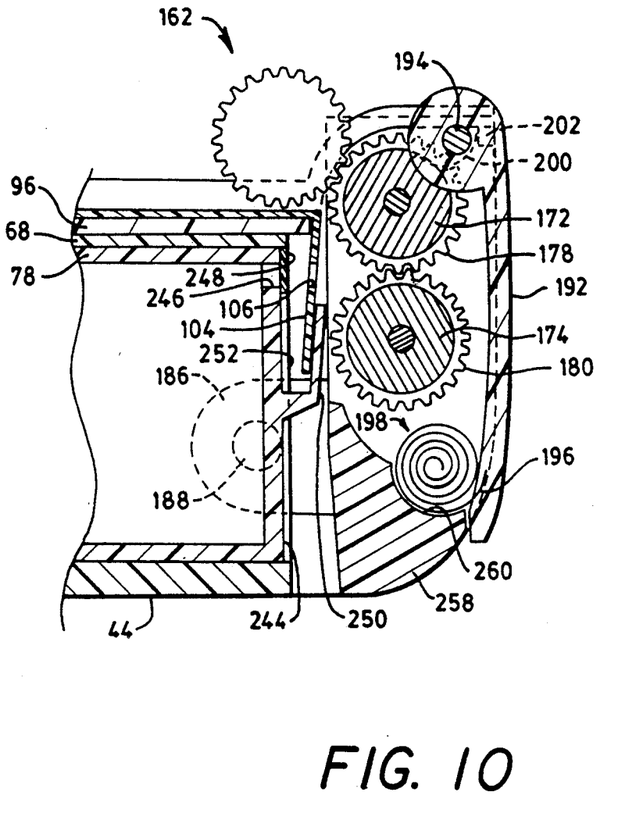
FIG. 10 is an enlarged side elevation showing a light shielding door in its operative position relative to a pair of spread rollers.

A frame 144 is mounted within the third housing 16. The frame 144 includes a central portion 146 having an upwardly extending member 148 the walls of which define an opening 150. A pair of side walls 152 and 154 extend downwardly from the central portion 146. Extending outwardly from the walls 152 and 154 are a pair of aprons 156 and 158. The apron 156 may provide a mounting support for the electronics of a strobe 160 (FIG. 4) while the apron 158 provides a support for a battery operated motor and gear train 162 which is adapted to rotate a timing gear 164 having a cam 166 on one face thereof. The central portion 146 also includes a forwardly extending portion 168 (FIGS. 1-3) which is terminated by an upwardly curved section 170. The curved section 170 accommodates a portion of a roller 172 which together with a second roller 174 define an apparatus 176 for rupturing the container 86 of an exposed film unit 80. As is well known in the art, the apparatus 176 spreads a processing liquid between predetermined layers of the exposed film unit 80 to initiate the formation of a visible image therein while simultaneously driving the film unit 80 toward the exterior of the camera 10. Each of the rollers 172 and 174 is provided on one end thereof with a gear 178 and 180, respectively, which are in mesh with each other with the gear 178 being driven by the gear train 162. The ends of the spread rollers 172 and 174 are journalled in the upstanding legs of a U-shaped bracket 182. The bracket 182 includes a pair of rearwardly extending arms 184 and 186 which are pivotally coupled to the third housing 16 about an axis 188 for clockwise movement of the apparatus 176 from its operative position, shown in FIG. 10, to a position, shown in FIG. 11, wherein it is available for maintenance such as cleaning of the rollers 172 and 174. Suitable means such as springs 190 are provided at each end of the roller 174 for resiliently biasing it toward the roller 172.

Figure 11:
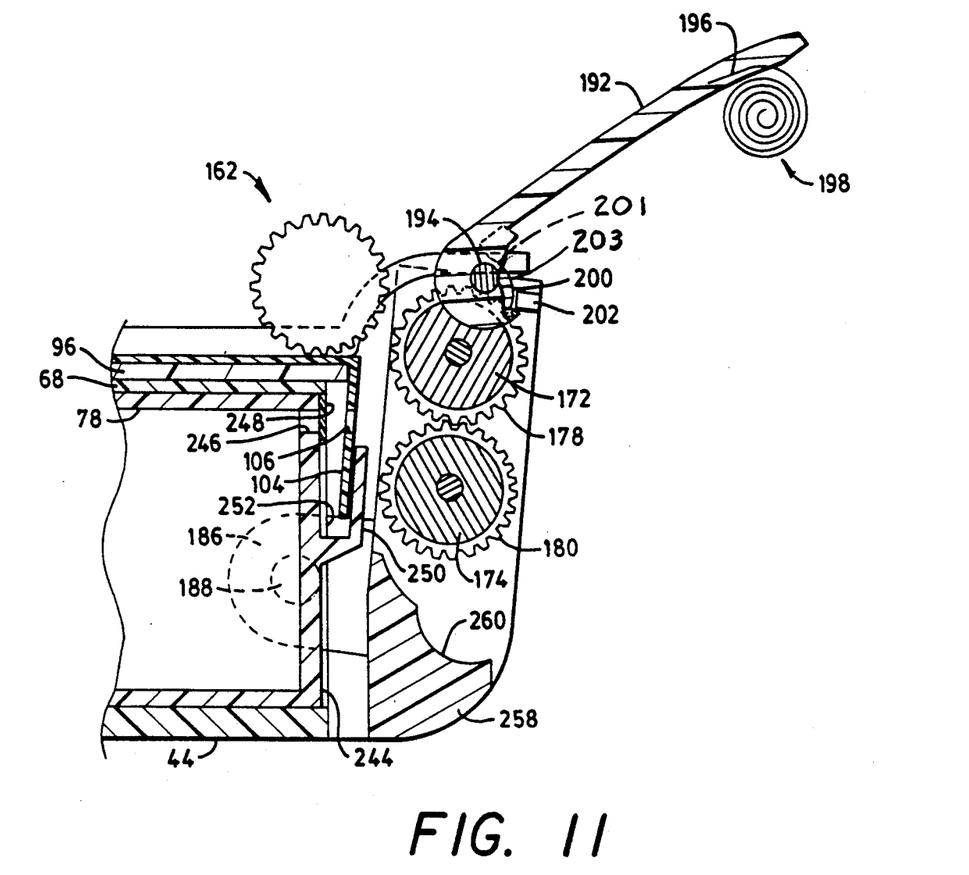
FIG. 11 is a view similar to FIG. 10 showing the door in a raised position and the spread rollers in a position wherein they may readily be inspected and/or cleaned.

A door 192 is pivotally mounted to the forward end (right, as viewed in FIG. 1) of the third housing 16 by a hinge pin 194. The door 192 functions as a light shield to prevent the passage of ambient light into the interior of the camera 10, especially passage of light between the spread rollers 172 and 174. The door 192 has a width which is greater than the longitudinal measurement of the spread roller assembly 176. A recess 196 is formed in the door 192 and is adapted to permanently receive one end of a sheet 198 of opaque, resilient material, e.g., Mylar, which in its unstressed condition assumes a coiled configuration. The pivotal end of the door 192 is formed with an annular camming surface 200 having a dwell portion 201 of fixed radius followed by a length 203 of increasing radius, which surface 200 is in engagement with a cam follower 202 located on one leg of the U-shaped bracket 182. Thus, when the photographer wishes to move the spread roller assembly 176 into its maintenance position, as shown in FIG. 11, he merely graps the free end of the door 192 and pivots it in a CCD thereby causing the surface 203 to cam the former in a clockwise direction thus breaking the drive connection between the power train and the gear 178. Thus disconnected, the spread rollers 172 and 172 may be freely rotated for inspection of their liquid spreading surfaces.

Referring back to FIG. 5, each of the walls 152 and 154 is provided with an opening 204 (only one shown) for receiving the hinge pin 20, i.e., the hinge pin 20 is adapted to pass through a first of the openings 204, then through the knuckles 100, 56, 102 and then through the second opening 204. Further, the upwardly extending member 148 includes a pair of laterally spaced projections 206 and 208 each of which is apertured so as to receive the hinge pin 18 thus pivotally coupling the third housing 16 to a pair of downwardly extending flanges 210 (only one being shown) formed integrally with the first housing 12.

The central portion 146 is provided with a pair of L-shaped slots 212 (only one being shown), said slots 212 being located on opposite sides of the upwardly extending member 148. Each of the L-shaped slots 212 is configured to receive an upwardly extending flange 214 and 216, each of which in turn includes an inwardly directed pin 218 and 220, respectively. The flanges 214 and 216 are fixedly attached to the side walls 92 and 94, respectively. A third flange 222 having an outwardly extending pin 224 extends upwardly from the side wall 94 and is adapted to pass through a suitably shaped slot (not shown) in an overlying section of the central portion 146. The pin 224 is adapted to be supported within an aperture 226 in the cam 166. A cylindrically configured cam follower 228 (see FIGS. 1-3) is rotatably secured to the top of the flange 222 on its outwardly facing surface by a pin 230. Again, with reference to FIGS. 1-3, the flange 214 is pivotally coupled to one end of a link 232 by the pin 218. The opposite end of the link 232 includes an elongate slot 234 for rotatably and slidably receiving a pin 236 which is formed with a flange 238 integrally formed in the first housing 12. The flange 216 is connected by the pin 220 to a second, laterally spaced, flange (not shown) in a similar manner. Also, the periphery of the opening 150 of the upwardly extending member 148 is connected to the periphery of an opening 239 in a wall 240 of the first housing 12 by an opaque bellows 242. Thus, image bearing light may pass through the cameras objective lens 32 and shutter 34 and will be reflected by the mirror 36 through the openings 239, 150, 110, 72 and 76 and onto the uppermost film unit 80 in the film cassette 54.

The film cassette 54 includes a leading end wall 244 having a laterally extending slot 246 therein which is dimensioned to permit the sequential movement of the dark slide 82 and the film units 80 therethrough. Ambient light is substantially prevented from entering the film cassette 54 via the slot 246 by a strip of flexible opaque material 248, the strip 248 being tacked or attached to the leading end wall 244 only along the former's top edge.

In addition to the dark slide 82 and the opaque strip 248, the film cassette 54 includes a laterally extending flange 250, (see FIGS. 10 and 11), which is formed with the leading end wall 244 to define a recess 252 for slidably receiving the lower or terminal end of the opaque member 104. Thus, when the housings 12, 14 and 16 of the camera 10 are in the erected position shown in FIG. 2, or in the collapsed position shown in FIG. 1, the flange 250 and the member 104 cooperate with each other to define a labyrinth type structure for preventing the passage of stray light to a location behind the terminal end of the member 104.

Figure 3:
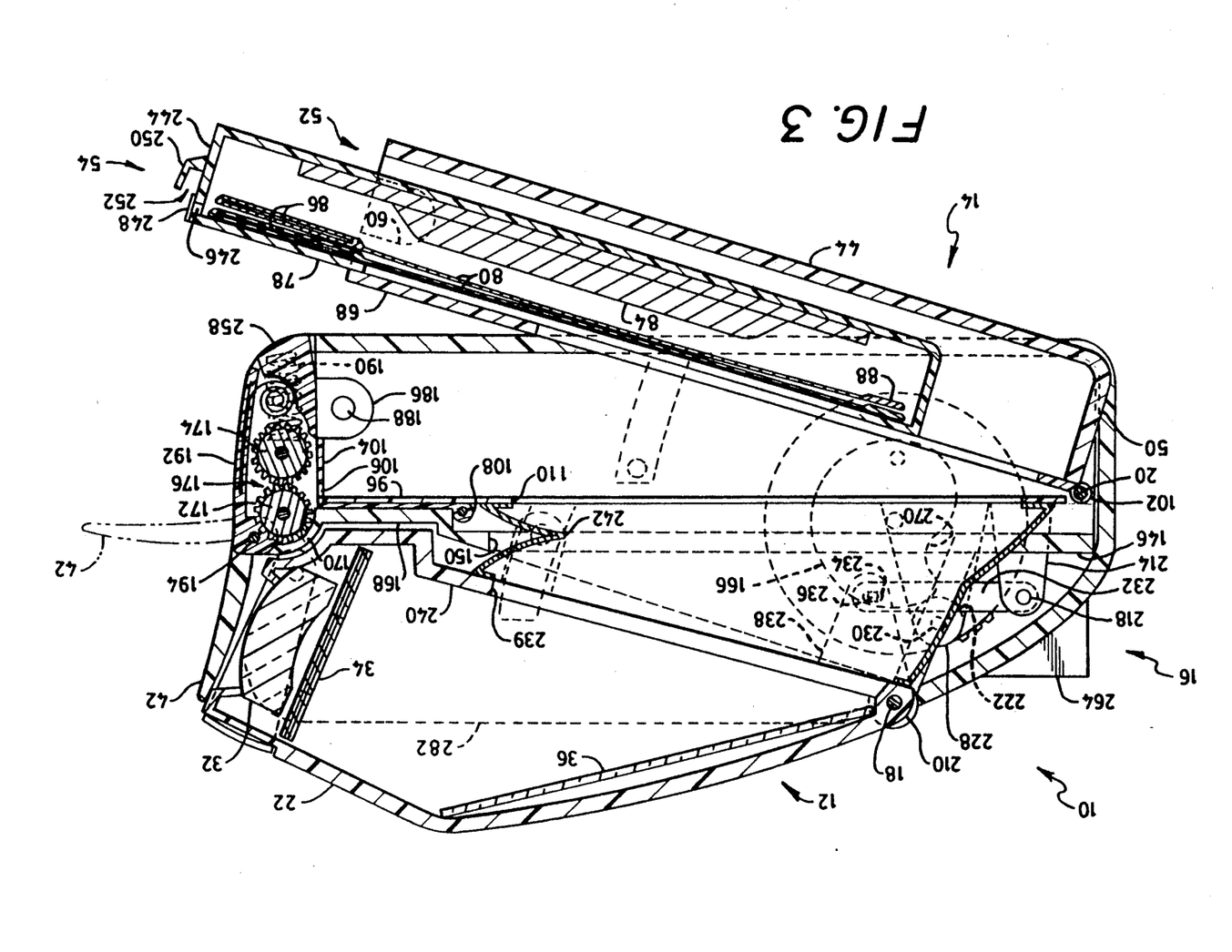
FIG. 3 is a side view of the camera shown in a film cassette loading/unloading position.

In the operation of the camera 10, the end 124 of the pivotally mounted latch plate 116 is manually moved rearwardly so as to move its latching end 120 out of engagement with the pin 114 thereby permitting clockwise rotation of the holder 15 under the bias of a spring (not shown) into the film cassette loading position shown in FIG. 3. With the holder 15 so located, a film cassette 54 containing a stack of instant film units 80 and a dark slide 82 may be inserted, trailing end first, into the open ended chamber 52. During such insertion, the protrusions 62 on the side walls 64 and 66 of the film cassette 54 are received by the open ended recesses 58 and 60 to guide the film cassette 54 into its proper position within the holder 15. Also, at this time, the terminals of the battery 84, which may be accessible through the cassette's trailing end wall, make electrical engagement with a pair of camera mounted contacts (not shown) so as to provide a source of energy for the camera's motor and gear train 162. After the film cassette 54 has been fully seated within the holder 15, the latter is pivoted in a counterclockwise direction (CCD), as viewed in FIGS. 1-3, about the hinge 20 until it is latched in the position shown in FIG. 1 by the cooperation between the latch plate 116 and the pin 114. At this time an electrical circuit to the motor and gear train 162 is momentarily and automatically closed so as to cause the gear 164 to be driven in a clockwise direction thereby moving a pin 254 on the face of the cam 166 into engagement with a rear surface 256 on the reciprocally mounted plate 128.

Movement of the pin 254 into and out of engagement with the rear surface 256 during each revolution of the gear 164 results in the plate 128 being driven to the right (as viewed in FIG. 1) against the bias of the spring 129. This movement of the plate 128 causes the film unit engaging member 142 to enter the trailing end of the film cassette 54 via the slot 70, engage the trailing edge of the dark slide 82 and move the latter out of the film cassette 54 via the slot 246, through the slot 106 and then into the bite of the spread rollers 172 and 174. The rollers 172 and 174, which are being driven at this time by the motor and gear train 162, continue the movement of the dark slide 82 until its leading edge engages the door 192. Further movement of the dark slide 82 to the right by the rollers 172 and 174 results in the door 192 being driven a few degrees in a CCD about its pivot 194 as the leading edge of the dark slide 82 moves downwardly along the interior surface of the door 192 until it engages and progressively unwinds the coiled sheet 198 of resilient and opaque material while the latter progressively covers the upper side of the advancing dark slide. Note, these few degrees of rotation of the door 192 do not rotate the roller support means 182 out of the position shown in FIG. 10 because only the dwell portion 201 of the camming surface 200 is in engagement with the cam follower 202. Just as the trailing end of the dark slide moves out of the bite of the rollers 172 and 174, the free end of the now uncoiled sheet 198 moves out of engagement with the dark slide's leading edge and returns to its coiled configuration where the outer convolution of the coil cooperates with a portion 258 of the third housing 16, located below the bottom roller 174, to releasably retain the trailing end of the dark slide 82 in engagement with the camera 10. The power to the motor is then stopped as is rotation of the gear 164 at the end of one revolution. The photographer may then, at his leisure, grasp the protruding dark slide 82 and fully remove it from the camera 10. The door 192 may now fully move into the position shown in FIG. 10 under the bias of a spring (not shown) wherein the coiled sheet is partially housed within a recess 260 formed in the portion 258.

Figure 4:
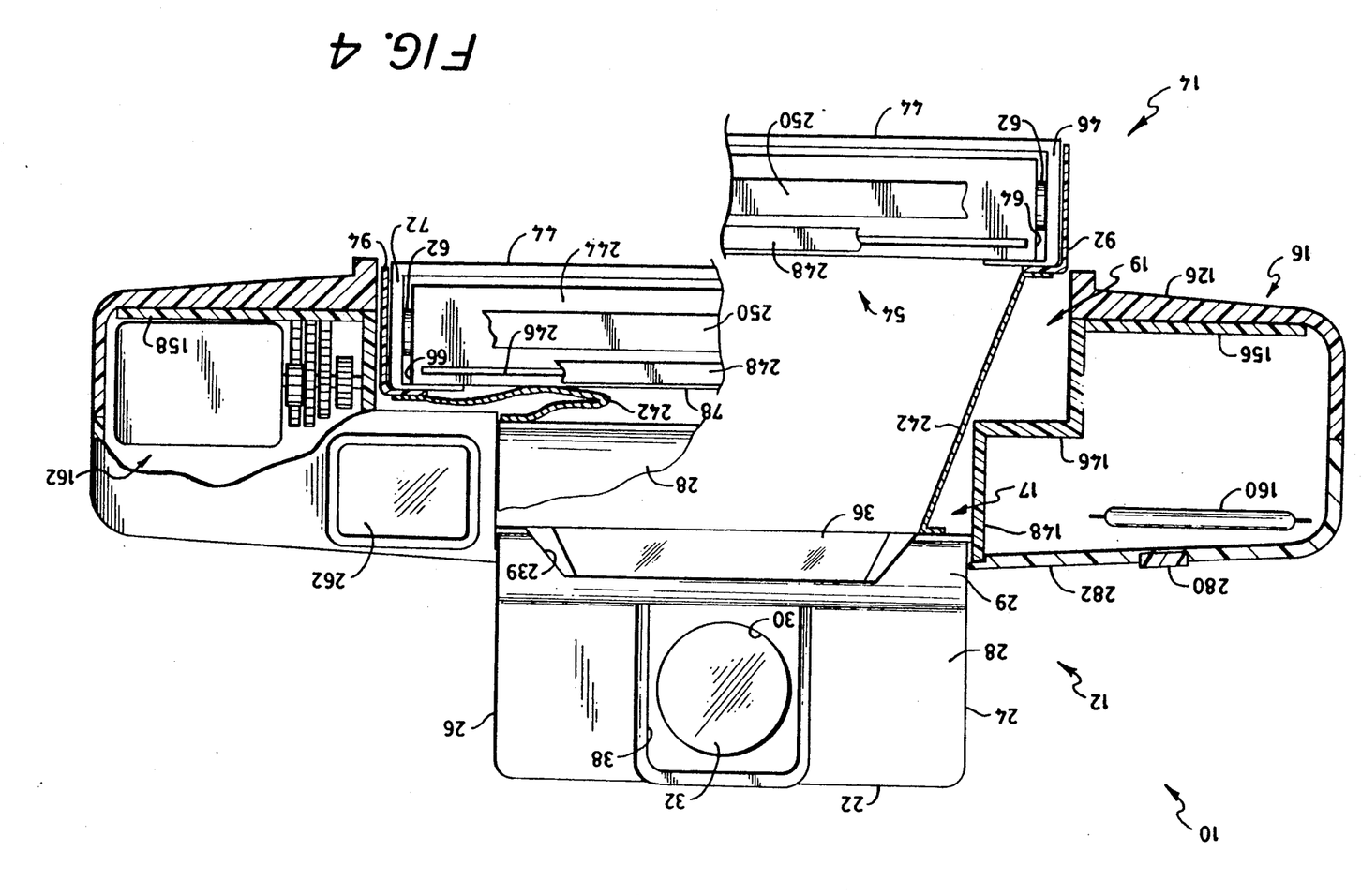
FIG. 4 is an enlarged front elevation of the camera, partly in section, in its erected condition or position with some elements also shown in their collapsed position.

During the one full revolution of the gear 164 and thus its associated cam 166, the housings 12, 14 and 16 are moved from a compact collapsed position (FIG. 1), in which a subject to be photographed may be viewed through a reverse Galilean viewfinder having an entrance window 262 (FIG. 4) and a manually collapsible viewing window 264 (FIG. 1), to an erected position (FIG. 2) wherein the subject may be photographed, and then back to the compact collapsed position. In the collapsed position the first housing 12 is adapted to be substantially fully nested within a recess 17 in the upper wall of the third housing 16 while the second housing 14 is to be similarly received within a recess 19 in the lower wall of the third housing 16, as best seen in FIG. 4. This movement is accomplished by an erecting means which includes the flanges 214, 216 and 222, 238, the connecting link 214, the cam 166, the cam follower 228 and a pair of springs 266 and 268, schematically shown in FIG. 1 as having one of their ends attached to the connecting link 232 and the flange 238, respectively, and their opposite ends grounded on a suitable fixed portion of housing 16. The dynamics of this movement is depicted in FIGS. 1 and 2 and is especially best illustrated in FIGS. 6–9, wherein many parts have been omitted so as to show this movement with respect to a portion 15 of the second housing 14.

Figure 6:
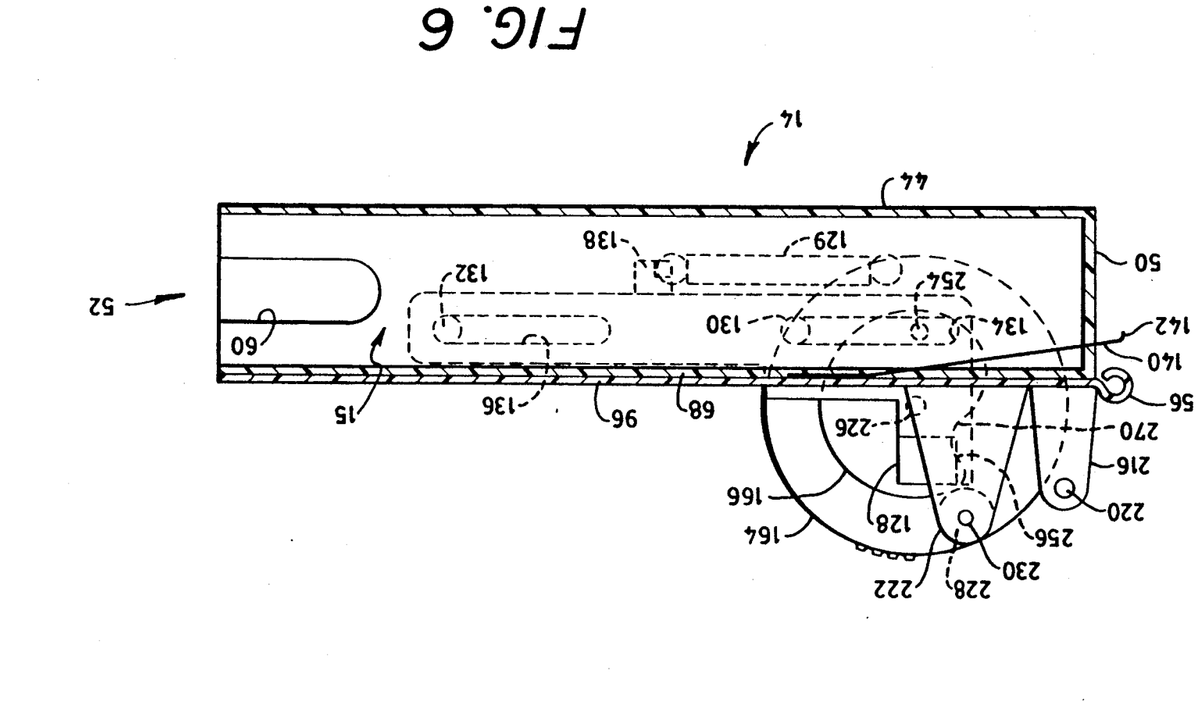
FIGS. 6-9 are sequential side schematical elevations, with elements including a film cassette being omitted for reasons of clarity, showing the spatial relation between various elements of the camera during an exposure cycle.
Figure 7:
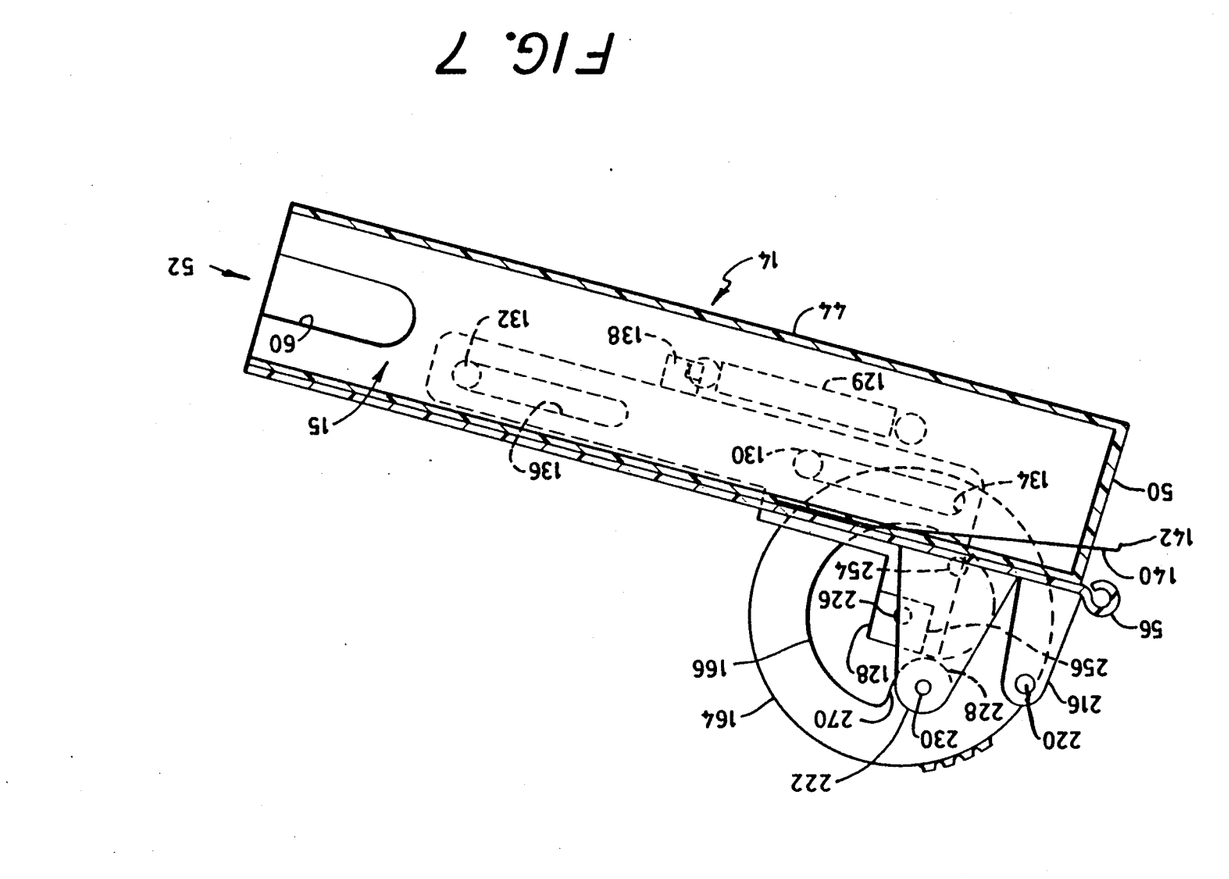

With reference to FIG. 6 it can be seen that rotation of the cam 166 in a clockwise direction results in a recess 270 in the periphery of the cam 166 moving toward the cam follower 228 until the latter is resiliently urged down into the recess 270 by the springs 266 and 268. Specifically, and with further reference to FIGS. 1 and 2, the spring 266 via its attachment to the link 232 is trying to cause the flange 214, and thus the second housing 14 and the flange 222, to move in a clockwise direction about the hinge pin 20 while the spring 268 is simultaneously urging the flange 238 and thus the first housing 12 in a CCD about the hinge 18. However, such movement of the second housing 14 is precluded because of the engagement between the cam follower 228 and the periphery of the cam 166 having the largest diameter. But, as the cam follower 228 starts to enter the recess 270, the spring 266 is now able to rotate the flange 214 in a clockwise direction thus moving the second housing 14 toward its erected position while simultaneously moving the connecting link 232 to the right thus allowing the erection of the first housing 12 under the bias of the spring 268. Rotation of the cam 166 in the clockwise direction continues until the cam follower 228 reaches the mid point of the recess 270, i.e., at the minimum diameter of the cam 166, as shown in FIGS. 2 and 7. The housings 12 and 14 are now in their erected position. Rotation of the cam 166 is now momentarily stopped for a predetermined period of time, e.g., 400 milliseconds, to enable the camera's shutter to be automatically opened and closed. As soon as the shutter closes, the rotation of the cam 166 is continued in the clockwise direction thereby causing the cam follower 228 to steadily move along an increasing diameter of the surface of the cam 166 as it leaves the recess 270 until it reaches the maximum diameter of the cam's peripheral surface. This continued rotation of the cam 166 results in the flange 222, the second housing 14, and the flange 214 moving upwardly returning to the positions shown in FIG. 1 and 8. Movement of the flange 214 to the position of FIG. 1 results in the first housing 12 being simultaneously pulled down into its collapsed position by the link's 232 connection to the flange 238. Movement of the housing 12 between the erected and collapsed positions is guided by a pair of pin 272 and slot 274 arrangements (only one being shown) in the first and third housings 12 and 16. A similar pin and slot arrangement 276 and 278 is provided between the second and third housings 14 and 16, respectively.

Figure 8:
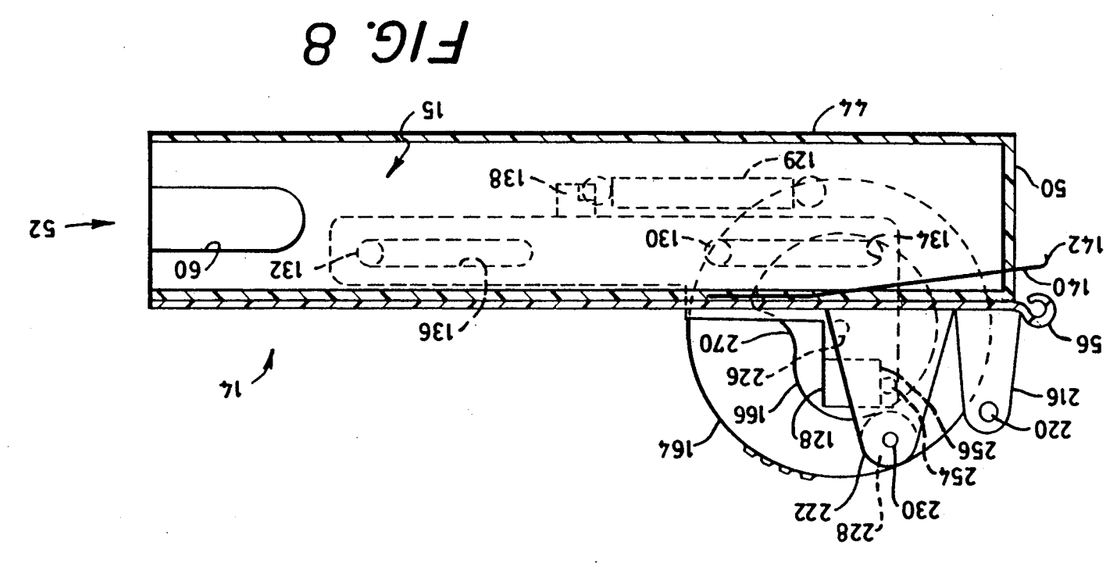
Figure 9:
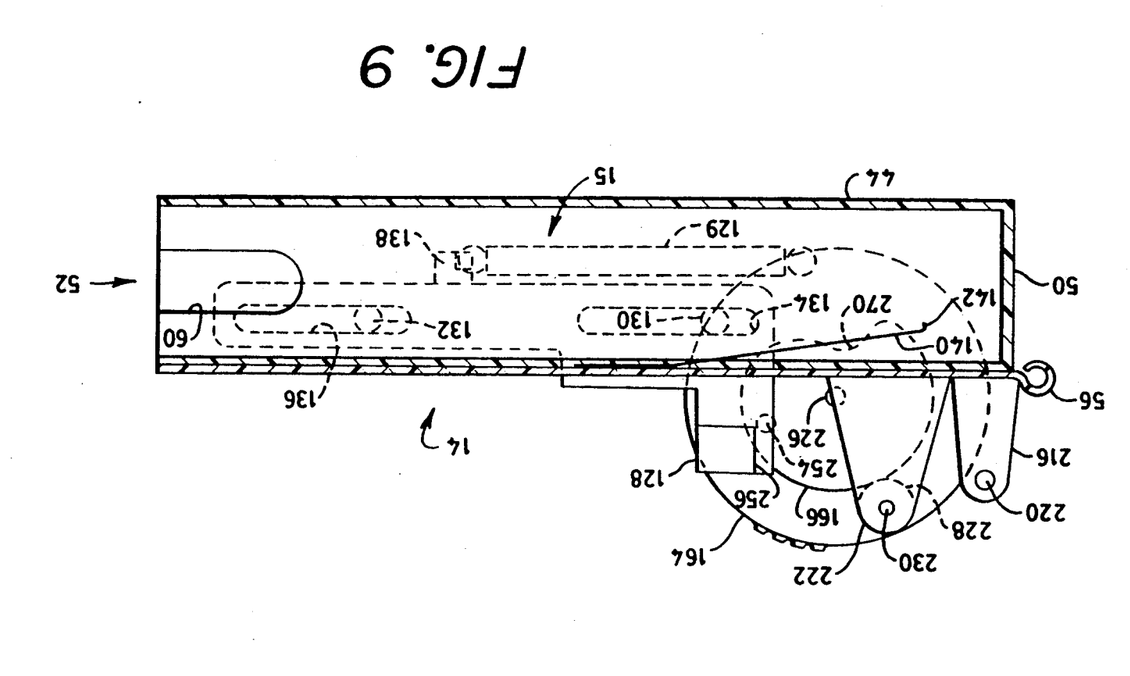

At this point in the rotation of the cam 166, the various housings of the camera are not only in a collapsed position but, as seen in FIG. 8, the pin 254 on the face of the cam 166 has been rotated into engagement with the rear surface 256 of the plate 128. As explained previously, further rotation of the cam 166 and the pin 254 results in the dark slide 82 being moved to the exterior of the camera 10. The rotation of the cam 166 is stopped when the cam 166 reassumes the position shown in FIGS. 1 and 6. The single revolution of the gear 164 and cam 166 represents a complete exposure cycle and is preferably completed within 660 milliseconds of its start.

The camera 10 is now ready for the photographic exposure of the uppermost film unit 80 in the film cassette 54. The subject of the exposure is viewed by means of the viewing window 264 and, after being properly framed, an exposure cycle is commenced by the actuation of a shutter release button 280, schematically shown in FIG. 4 as being mounted in a recess in an upper surface 282 of the third housing 16. Depression of the button 280 is effective to connect the motor and gear train 162 to the battery 84 for a period of time sufficient to drive the cam 166 through an angle of approximately 45 degrees, i.e., from the position shown in FIG. 6 to that shown in FIG. 7. As can best be seen in FIG. 2, although the open end 52 of the second housing 14 is now exposed to the ambient light, such light is precluded from entering the slot 246 in the film cassette 54 by the L-shaped member 104 having the laterally extending opening 106 therin. As previously mentioned, usually the engagement between the member 104 and the superposed forwardly extending portion 168, when the second housing 14 is in the collapsed position, keeps the slot 246 and opening 106 in alignment with each other, as shown in FIG. 1. However, the L-shaped member 104 is spring biased into the position shown in FIG. 2 when it is not being constrained by the portion 168. Alternately, the member 104 may be formed from a resilient material which normally assumes the position shown in FIG. 3. In this latter position, the opening 106 has moved upwardly relative to the slot 246 such that the remainder of the L-shaped member 104 having the opening 106 therein is in light blocking relation to the slot 246 and assists the strip 248 in preventing the entry of light into the film cassette via its slot 246. Also, the L-shaped member 104 functions as a cassette hold back insofar as it prevents the cassette 54 from leaving the open ended chamber 52 during movement of the second housing 14 between the erected and collapsed positions. When the cam 166 has been rotated into the position shown in FIG. 2, the rotation of the cam 166 is momentarily stopped, the housings 12 and 14 are in their fully erect position and the shutter blades of the lens and shutter assembly 34 are automatically opened and closed for a period of time sufficiently long to properly expose the film unit. Rotation of the cam 166 is automatically started again, preferably after a total delay of no more that 400 milliseconds including the exposure interval. Such further rotation of the cam 166 is effective to move the first and second housings 12 and 14 back to the collapsed position shown in FIG. 1 while simultaneously driving the exposed film unit 80 part way out of the film cassette 54 and into the bite of the rotating rollers 172 and 174. The rollers 172 and 174 continue the movement of the exposed film unit 80 toward the exterior of the camera 10 while simultaneously rupturing a container 86 of processing liquid and spreading the latter between layers of the film unit to initiate the formation of a visible image therein. The remainder of the passage of the exposed film unit to the exterior of the camera is identical to that previously explained with reference to the ejection of the dark slide 82.

Since certain changes may be made in the above-described invention without departing from the scope of the invention herein involved, it is intended that all matter contained in the above description or shown in the accompanying drawings shall be interpreted as illustrative and not in a limiting sense.

What is claimed is:

1. A camera comprising:
a plurality of housings pivotally coupled to each other for movement between a compact collapsed position in which a subject to be photographed may be viewed and an erected position in which an exposure of the subject may be taken;
an optical and exposure system;
means for initiating an exposure cycle; and
means for moving said plurality of housings between said collapsed and erected positions, said moving means being energized in response to actuation of said initiating means to move said housings from said collapsed position to said erected position, whereat relative movement between said plurality of housings is momentarily stopped while the subject is photographically exposed, and then back to said collapsed position.

2. A camera as defined in claim 1 wherein said plurality of housings includes first and second housings mounted for movement in opposite directions as they are moved from said collapsed to said erected position.

3. A camera as defined in claim 2 wherein said plurality of housings includes a third housing, said third housing including means for framing the subject to be photographically exposed.

4. A camera as defined in claim 3 wherein said optical and exposure system includes an objective lens mounted in said first housing.

5. A camera as defined in claim 4 wherein said third housing includes a flange which is adapted to overlie said objective lens in a protective relationship when said plurality of housings are in said collapsed position.

6. A camera as defined in claim 4 wherein said second housing includes means defining a chamber for receiving and locating a film cassette in position for the exposure of a film unit contained therein.

7. A camera as defined in claim 6 further including a pair of spread rollers mounted adjacent one end of said third housing, film advancing means for moving an exposed film unit from the film cassette into the bite of said rollers, and means for driving said film advancing means and at least one of said rollers so as to continue the movement of the exposed film unit away from the film cassette while simultaneously rupturing a container of processing liquid associated with the exposed film unit and spreading its contents across a predetermined layer thereof to initiate the formation of a visible image in the film unit.

8. A camera as defined in claim 2 wherein said plurality of housings includes a third housing, said moving means further includes (1) means including a cam follower coupling said first and second housings for movement between said collapsed and erected positions and (2) a cam mounted on said third housing for engagement by said cam follower.

9. A camera as defined in claim 8 wherein said cam is fixedly and rotatably mounted on said third housing and is adapted to be driven through one revolution per photographic cycle.

10. A camera as defined in claim 9 wherein said second housing further includes means defining an open ended chamber for receiving and locating a film cassette in position for the exposure of a film unit contained therein.

11. A camera as defined in claim 10 further including (1) a pair of pressure-applying rollers mounted on said third housing, (2) film advancing means for moving an exposed film unit from the film cassette into engagement with said rollers, and (3) means for driving said film advancing means and said rollers in a manner to move the exposed film unit into and through said rollers while the latter spread a processing liquid across a layer of the exposed film unit to initiate the formation of a visible image therein.

12. A camera as defined in claim 1 wherein said plurality of housings includes first, second and third housings, said third housing including means for defining a first recess for receiving at least a major portion of said first housing when said first, second and third housings are in said collapsed position.

13. A camera as defined in claim 12 further including a bellows connected between said first and third housings.

14. A camera as defined in claim 1 wherein said plurality of housings includes a third housing, said third housing including means for defining a recess for receiving at least a major portion of said second housing when said plurality of housings are in said collapsed position.

15. A camera as defined in claim 14 futher including a bellows connected between said second and third housings.

16. A camera as defined in claim 1 wherein said plurality of housings include a third housing, said third housing including first and second recesses for receiving at least a major portion of said first and second housings, respectively, when said plurality of housings are in said collapsed position.

17. A camera as defined in claim 16 further including first and second bellows connected between said first and second housings and said second and third housings, respectively.

18. A camera comprising:
a first housing:
an optical and exposure system including at least one component supported by said first housing;
a second housing for supporting a film cassette in position for the exposure of a film unit contained therein;
a third housing;
means for pivotally coupling said first and second housing to said third housing for movement between collapsed and erected positions;
a viewfinder for framing a subject to be photographed, said viewfinder being operative when said first and second housings are in said collapsed position;
manually operable means actuatable when said first and second housings are in said collapsed position for initiating an exposure cycle during which said first and second housings are momentarily moved to said erected position, in which a shutter in said optical and exposure system is actuated to expose the film unit, and then returned to said collapsed position; and
means for moving said first and second housings from said collapsed to said erected and back to said collapsed position during said exposure cycle.

19. A camera as defined in claim 18 wherein said moving means drives said first and second housings toward said third housing as they are moved into their said collapsed position.

20. A camera as defined in claim 19 wherein said one component is a mirror.

21. A camera as defined in claim 20 further including means for speading a processing liquid across a layer of an exposed film unit, and means for mounting said spreading menas near an end of said third housing opposite its pivotal connection with said first and second housings.

22. A camera as defined in claim 18 wherein said moving means includes a battery operated motor and a cam coupled to said motor.

23. A camera as defined in claim 18 wherein said third housing includes a recess for receiving said first housing when the latter is in said collapsed position.

24. A camera as defined in claim 23 wherein said one component comprises an objective lens mounted adjacent an end of said first housing opposite its pivotal connection to said third housing and said recess includes a wall adapted to overlie said objective lens when said first housing is in said collapsed position.

25. A camera as defined in claim 24 further including a lens hood mounted in encompassing relation to said objective lens.

26. A camera as defined in claim 24 further including means for pivotally coupling said wall to said third housing for movement to a position wherein a face of said objective lens is exposed for cleaning purposes.

27. A camera as defined in claim 18 wherein said third housing includes a recess for receiving said second housing when the latter is in said collapsed position.

28. A camera as defined in claim 27 wherein said third housing further includes a second recess for receiving said first housing when the latter is in said collapsed position.

29. A camera as defined in claim 28 further including a pair of motor driven rollers for spreading a processing liquid across a layer of a film unit subsequent to its exposure and means for moving the exposed film unit between said driven rollers.

30. A camera as defined in claim 29 further including means for mounting said pair of rollers adjacent an end of said third housing opposite to its pivotal connection to said first and second housings.

31. A camera comprising:
means for locating a film cassette in position for the exposure of a film unit contained therein;
means for exposing a film unit, said exposing means including an objective lens and a shutter;
means for supporting said exposing means for movement between a first inoperative position adjacent said locating means and a second operative position spaced further away from said locating means and in which position said exposing means are positioned to direct an image of a subject onto the film unit; and
means for moving said supporting means from said first position to said second position and back to said first position during every exposure cycle, said moving means including means for delaying movement of said supporting means from said second position to said first position for a period of time sufficient to enable actuation of said shutter so as to expose the film unit.

32. A camera as defined in claim 31 wherein said moving means is energized in response to the actuation of an exposure cycle initiating member.

33. A camera as defined in claim 31 wherein said period of time is less than 400 milliseconds.

34. A camera as defined in claim 31 wherein said exposure cycle is completed within 660 milliseconds of its start.

* * * * *